(12) United States Patent
Williams et al.

(10) Patent No.: US 8,810,987 B2
(45) Date of Patent: Aug. 19, 2014

(54) METHOD AND APPARATUS FOR POWER MANAGEMENT IN ETU WITHIN A CIRCUIT BREAKER WHEN USED AS A HOST CONTROLLER

(71) Applicant: General Electric Company, Schenectady, NY (US)

(72) Inventors: Craig Benjamin Williams, Louisville, KY (US); Timothy Ray Jackson, Louisville, KY (US); Ramon Portillo, Louisville, KY (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 13/656,374

(22) Filed: Oct. 19, 2012

(65) Prior Publication Data
US 2014/0111898 A1    Apr. 24, 2014

(51) Int. Cl.
*H02H 3/00*    (2006.01)
(52) U.S. Cl.
USPC ............................................ 361/115; 361/42
(58) Field of Classification Search
USPC ............................................ 361/42–50, 115
See application file for complete search history.

(56) References Cited

U.S. PATENT DOCUMENTS

| | | | |
|---|---|---|---|
| 6,167,329 A | 12/2000 | Engel et al. | |
| 6,175,780 B1 | 1/2001 | Engel | |
| 6,433,982 B1 * | 8/2002 | Santos | 361/93.2 |
| 6,621,672 B2 | 9/2003 | Bilac | |
| 6,731,487 B2 | 5/2004 | Fletcher et al. | |
| 7,369,389 B2 | 5/2008 | Vicente et al. | |
| 7,839,617 B2 | 11/2010 | Vicente et al. | |
| 7,936,547 B2 | 5/2011 | Dougherty et al. | |
| 8,018,092 B2 | 9/2011 | Vicente et al. | |
| 8,120,886 B2 | 2/2012 | Anand et al. | |

OTHER PUBLICATIONS

"Electronic Trip Unit For SB Encased Systems Breakers", Information and Instruction Guide, 2000.

* cited by examiner

*Primary Examiner* — Danny Nguyen
(74) *Attorney, Agent, or Firm* — General Electric Company

(57) ABSTRACT

A method for enabling an ETU to function as a host controller is provided. The ETU includes a power bus port, a current sensor input, and a power distributor coupled to the power bus port and the current sensor input. The method includes determining that a peripheral device is connected to the power bus port. The method further includes determining that sufficient input power is available to the ETU to provide an output power to the peripheral device through the power bus port. Additionally, the method includes providing the output power to the peripheral device through the power bus port.

20 Claims, 3 Drawing Sheets

METHOD AND APPARATUS FOR POWER MANAGEMENT IN ETU WITHIN A CIRCUIT BREAKER WHEN USED AS A HOST CONTROLLER

BACKGROUND OF THE INVENTION

The field of the invention relates generally to electronic trip units (ETUs) and more particularly to power management within an ETU.

An electronic trip unit is a device which protects a circuit and equipment connected to the circuit. In industrial settings, for example, an ETU serves to prevent damage to equipment and machines that, in many cases, represent a significant investment by a business and on whose operation the business relies. An ETU carries out this function by monitoring electrical current across a line and, if the current exceeds a certain threshold, will open a switch in the line, thereby preventing further current from reaching devices that would be damaged by the excessive current. The switch may be opened and closed by, for example, an electromechanical actuator.

Given the role that an ETU plays in protecting the equipment connected to it, it is beneficial to determine whether the ETU is in proper working order, through diagnostics and maintenance. Generally, at least one piece of electrical equipment external to the ETU is utilized to determine the status of an ETU, including whether any malfunctions have occurred. Usually, such a piece of equipment is carried by a technician ("user") and requires an external source of power, which the user must locate and draw power from, in order to proceed with servicing an ETU. In many instances external power sources are not readily available. Simply including a power bus port for a peripheral device in an ETU would put the ETU at risk of losing its primary functionality of protecting a circuit. That is, ETUs are typically self-powered devices that do not have a predictable input power, which is typically proportional to circuit breaker load current. Accordingly, an ETU may not be able to supply output power to a peripheral device during low input power conditions without collapsing ETU busses and compromising standard ETU protections.

BRIEF DESCRIPTION OF THE INVENTION

In one aspect, a method for enabling an ETU to function as a host controller is provided. The ETU includes a power bus port, a current sensor input, and a power distributor coupled to the power bus port and the current sensor input. The method includes determining that a peripheral device is connected to the power bus port, and determining that sufficient input power is available to the ETU to provide an output power to the peripheral device through the power bus port. Additionally, the method includes providing the output power to the peripheral device through the power bus port.

In another aspect, an ETU configured to function as a host controller is provided. The ETU includes at least one current sensor input, a power distributor coupled to the at least one current sensor input, a memory, a processor coupled to the memory and to the power distributor, and a power bus port coupled to the processor. The memory includes processor-executable instructions that, when executed by the processor, cause the ETU to determine that a peripheral device is connected to the power bus port, determine that sufficient input power is available to the ETU to provide output power to the peripheral device through the power bus port, and provide output power to the peripheral device through the power bus port.

In another aspect, a system for monitoring and diagnosing errors in an ETU is provided. The system includes an ETU including a power bus port. The system also includes an ETU diagnostic device connected to the power bus port. The ETU is configured to provide power to the ETU diagnostic device through the power bus port only upon a determination that sufficient power is available to the ETU to sustain operation of the ETU and the ETU diagnostic device.

DETAILED DESCRIPTION OF THE INVENTION

Figure 1:
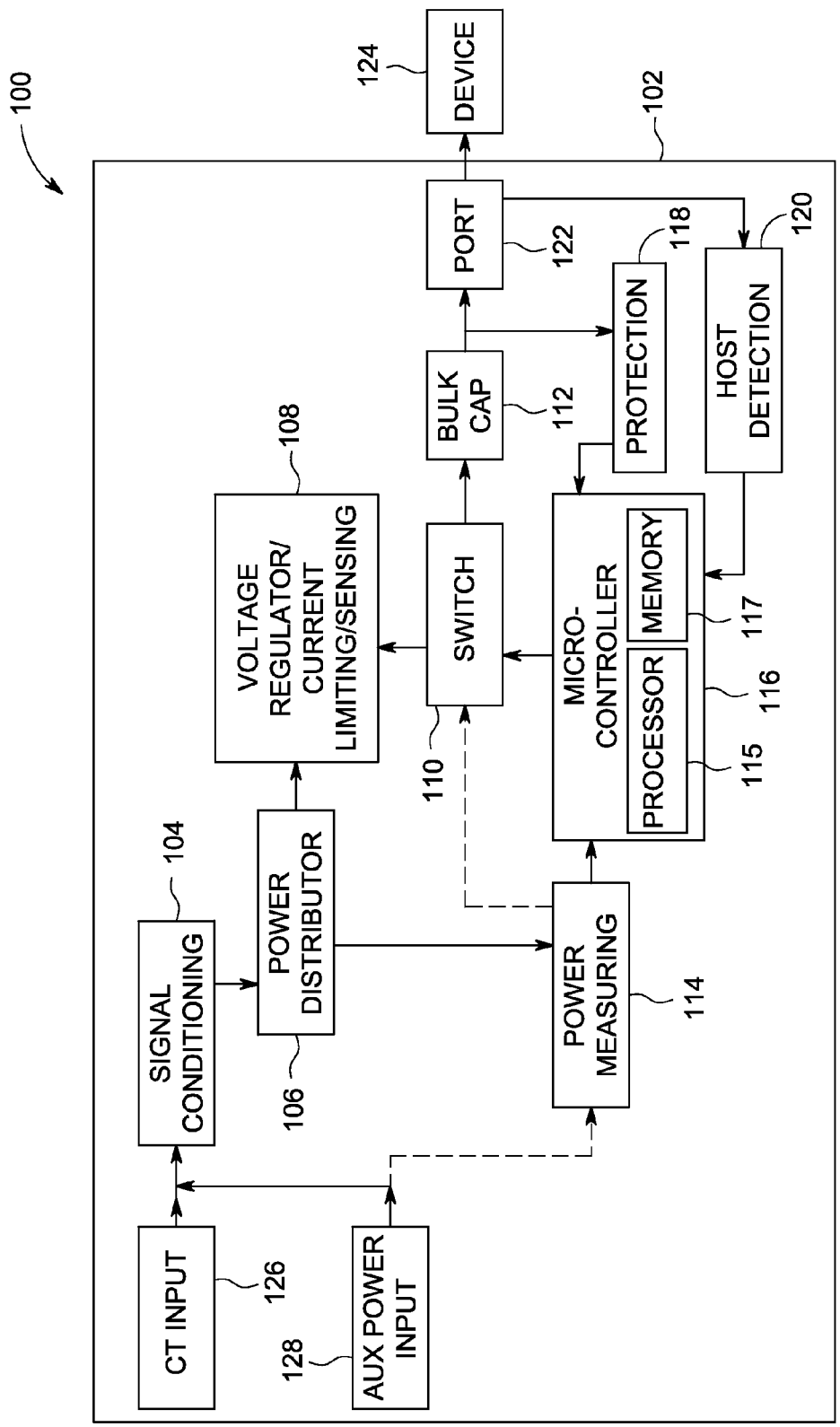
FIG. 1 is a block diagram of a system for enabling an ETU to function as a host controller, in accordance with an exemplary embodiment of the present invention.

FIG. 1 is a block diagram of a system 100 for enabling an ETU 102 to function as a host controller, in accordance with an exemplary embodiment of the present invention. Within the context of this specification, the term "power bus" means a data-communication medium which provides power from one electronic device, a host controller, to another electronic device, a peripheral device. Examples of power busses include those in conformance with Universal Serial Bus (USB) standards and those in conformance with the Institute of Electrical and Electronics Engineers (IEEE) 1394 standards.

ETU 102 includes a signal-conditioning component 104 coupled to a power distributor 106. Power distributor 106 is coupled to a voltage-regulation and current-limiting component 108. Voltage-regulation and current-limiting component 108 is coupled to a switch 110. Switch 110 is coupled to a bulk capacitor 112. In alternative embodiments, bulk capacitor 112 is located elsewhere in ETU 102 or not included at all. Power distributor 106 is also coupled to a power-measuring component 114. Power-measuring component 114 is also coupled to a microcontroller 116. Microcontroller 116 is also coupled to switch 110, a protection component 118, and a host-detection component 120. A power bus port 122 coupled to bulk capacitor 112, protection component 118, and host-detection component 120 provides an interface for a peripheral device to couple with ETU 102. Coupled to signal-conditioning component 104 are a current sensor input 126 and an auxiliary power input 128. In some embodiments, auxiliary power input 128 is further coupled to power-measuring component 114. Also, in some embodiments, power-measuring component 114 is coupled to switch 110.

ETU 102 draws power from at least one current transformer, or other current sensor, through at least one current sensor input 126. In some embodiments, an auxiliary power source is coupled to auxiliary power input 128 to provide an additional or alternative source of power. As mentioned above, signal-conditioning component 104 is coupled to current sensor input 126 and auxiliary power input 128. Signal-conditioning component 104 improves the quality of power provided to ETU 102, and more specifically, power distributor 106, from current sensor input 126 and/or auxiliary power input 128. In some embodiments, signal-conditioning component 104 may be incorporated within power distributor 106. Power distributor 106 receives conditioned power from current sensor input 126 and/or auxiliary power input 128 and provides the power to the ETU 102. For example, in an embodiment, power distributor 106 acts as an internal power supply for ETU 102, making power available to the components of ETU 102 on an as-needed and as-available basis to enable ETU 102 to function as described herein.

Voltage-regulation and current-limiting component 108 functions to maintain constant voltage and current levels from current sensor input 126 and/or auxiliary power input 128, so as to protect other components of ETU 102 from damage due to irregular voltages or currents. In some embodiments, voltage-regulation and current-limiting component 108 may be incorporated within power distributor 106.

Switch 110 is controlled at least by voltage-regulation and current-limiting component 108 and microcontroller 116. In some embodiments, power-measuring component 114 also is coupled to switch 110 to control the operation of switch 110. Switch 110 may be closed to provide power from ETU 102 to peripheral device 124 or opened to prevent power from being provided from ETU 102 to peripheral device 124. The provision and non-provision of power to peripheral device 124 is discussed in more detail below. In embodiments in accordance with the present invention, switch 110 may be, for example, mechanical, electromechanical, a relay, or a semiconductor, for example, a transistor or silicon-controlled rectifier (SCR).

Coupled between switch 110 and power bus port 122 is bulk capacitor 112. Bulk capacitor 112 stores energy during a normal operation of ETU 102 and discharges any stored energy when power for peripheral device 124 is momentarily unavailable. Accordingly, bulk capacitor 112 functions to "smooth out" drops in the power available to peripheral device 124, caused for example, by switch 110 alternating between a closed state and an open state. In alternative embodiments, bulk capacitor 112 is located elsewhere in ETU 102 or not included at all.

Power-measuring component 114 determines whether power available from one or more current transformers, or other current sensors, coupled to current sensor input 126 is sufficient to allow ETU 102 to perform critical functions and provide power to peripheral device 124. Critical functions of ETU 102 include, for example, metering and monitoring the status of a circuit, logging errors, and activating an electromechanical switch allow or prevent a current through a circuit being monitored by ETU 102. In some embodiments, ETU 102 may require, for example, 25 milliamps at five volts to sustain critical functions and peripheral device 124 may require 100 milliamps at five volts to operate in a low-power mode. Peripheral device 124 may require additional current to operate in one or more additional modes. For example, peripheral device 124 may require up to 500 milliamps to operate in a second mode that provides more functionality than the low-power mode.

In some embodiments, power-measuring component 114 is included in power distributor 106. Power-measuring component 116 includes, for example, analog circuitry for measuring a current and a voltage from current sensor input 126. The analog circuitry may be coupled to an analog-to-digital converter (ADC) to facilitate communication of data with microcontroller 116. Power-measuring component 116 may be configured to add currents of different phases to arrive at a total available current from one or more current transformers or other current sensors coupled to ETU 102. Additionally, in some embodiments, logic such as adding currents of multiple phases to determine a total available current may instead be performed by microcontroller 116. Additionally, in some embodiments, ETU 102 may include multiple power-measuring components 114, each coupled to a different current sensor input 126 and/or corresponding to a different phase of current and coupled to microcontroller 116.

Microcontroller 116 contains a processor 115 coupled to a memory 117 containing processor-executable instructions for communicating with peripheral device 124 through a power bus. The power bus may be, for example, USB 1.0, USB 2.0., or USB 3.0, or a bus in conformance with IEEE 1394. Additionally, memory 117 of microcontroller 116 contains processor-executable instructions for determining whether to open or close switch 110 to provide power to peripheral device 124. Included in the processor-executable instructions are instructions for determining whether sufficient power is available from power distributor 106 to allow ETU 102 to fulfill critical functions discussed above. Stored within memory 117 of microcontroller 116 is information regarding how much power is required to maintain critical functions of ETU 102. For example, ETU 102 may require 25 milliamps of current at five volts in order to perform critical functions.

Additionally, peripheral device 124 may require, for example, 100 milliamps at five volts to operate. If the available voltage and the available current, as determined by power-measuring component 114, is greater than or equal to 125 milliamps at five volts, microcontroller 116 may cause switch 110 to close, thereby providing power to peripheral device 124. Microcontroller 116 may also communicate with peripheral device 124 to determine whether peripheral device 124 is capable of operating in one or more additional modes which provide additional functionality and require more power. If so, and if the power-measuring component 114 indicates that sufficient power is available for ETU 102 to maintain its critical functions and allow peripheral device 124 to operate in an additional mode at a higher power, for example 500 milliamps at five volts, microcontroller 116 will communicate with peripheral device 124 to operate in the additional mode and will ensure that sufficient power is available to peripheral device 124 through power bus port 122.

If, in the above example, the available current at five volts drops to less than 525 milliamps, microcontroller 116 may communicate with peripheral device 124 to operate in a mode that requires less power. However, if there is insufficient power to support any mode of peripheral device 124, microcontroller 116 will instruct switch 110 to open, thereby preventing peripheral device 124 from receiving any power from ETU 102. As discussed above, bulk capacitor 112 may still enable peripheral device 124 to operate for a period of time as bulk capacitor 112 discharges stored energy. Additionally, microcontroller 116 may employ hysteresis on on/off thresholds for determining whether switch 110 should be opened or closed. That is, rather than using one threshold to determine whether sufficient power is available for peripheral device 124 to operate, microcontroller 116 may instead use an upper threshold and a lower threshold. If the available power drops to less than the lower threshold, then microcontroller causes switch 110 to open. However, in order for microcontroller 116 to cause switch 110 to close, the available power must be greater than or equal to the upper threshold. Accordingly, a power level between the upper and lower thresholds will not cause switch 110 to change from its opened or closed state. Employing hysteresis, as discussed above, can reduce the likelihood of rapid changes between the opened and closed state of switch 110.

As mentioned above, protection component 118 and host-detection component 120 are coupled to microcontroller 116 as well. In other embodiments, either or both of protection component 118 and host-detection component 120 are incorporated into microcontroller 116 as processor-executable instructions, rather than separate hardware. Host-detection component 120 detects the presence of a peripheral device connected to power bus port 122. If host-detection component 120 does not detect the presence of a peripheral device 124 connected to power bus port 122, then switch 110 will remain open.

Protection component 118 determines whether a fault exists in power bus port 122 and/or peripheral device 124. That is, protection component 118 determines whether supplying power through power bus port 122 could cause the ETU 102 to lose the ability to maintain critical functions. Protection component 118 causes power to be momentarily pulsed to peripheral device 124 through power bus port 122 by closing switch 110. Upon pulsing power to peripheral device 124 through power bus port 122, protection component 118 monitors the output current to determine if it exceeds a predetermined threshold, indicating that a short circuit or other fault is present. If a fault exists, protection component 118 causes switch 110 to open, thereby preventing additional power from being available at power bus port 122. Protection component 118 or microcontroller 116 may provide an indication that a fault has been detected in the power bus port 122 and/or peripheral device 124. For example, a light emitting diode (LED) may illuminate, an audible alarm may sound, or an error message may appear on a human machine interface. Further, protection component 118 may cause ETU 102 to wait a predetermined amount of time before attempting to supply power through power bus port 122 to a peripheral device 124 again.

Peripheral device 124 is any device which is configured to communicate and receive power through a power bus. In exemplary embodiments, peripheral device 124 is configured to communicate with microcontroller 116 to obtain a status of one or more components of ETU 102 or a circuit being monitored by ETU 102, and report the status to a user of the peripheral device 124. In other embodiments, peripheral device 124 interfaces with ETU 102 through power bus port 122 and communicates wirelessly with another device. Peripheral device 124 may communicate using a wireless communication protocol, for example an IEEE 802.11 protocol or Bluetooth (Bluetooth is a trademark of BLUETOOTH SIG, Inc. of Washington, Del.). Wireless communication with ETU 102, through peripheral device 124, allows a user to perform circuit breaker set-up and diagnostics while maintaining a safe distance. For example, a user may be able to remain outside an ARC-Blast boundary defined by the National Fire Protection Association (NFPA). Such wireless communication functionality also allows other, non-specialized computer devices, such as tablets, laptops, and mobile hand-held devices to communicate with the peripheral device 124 and/or ETU 102 when loaded with appropriate software.

Figure 2:
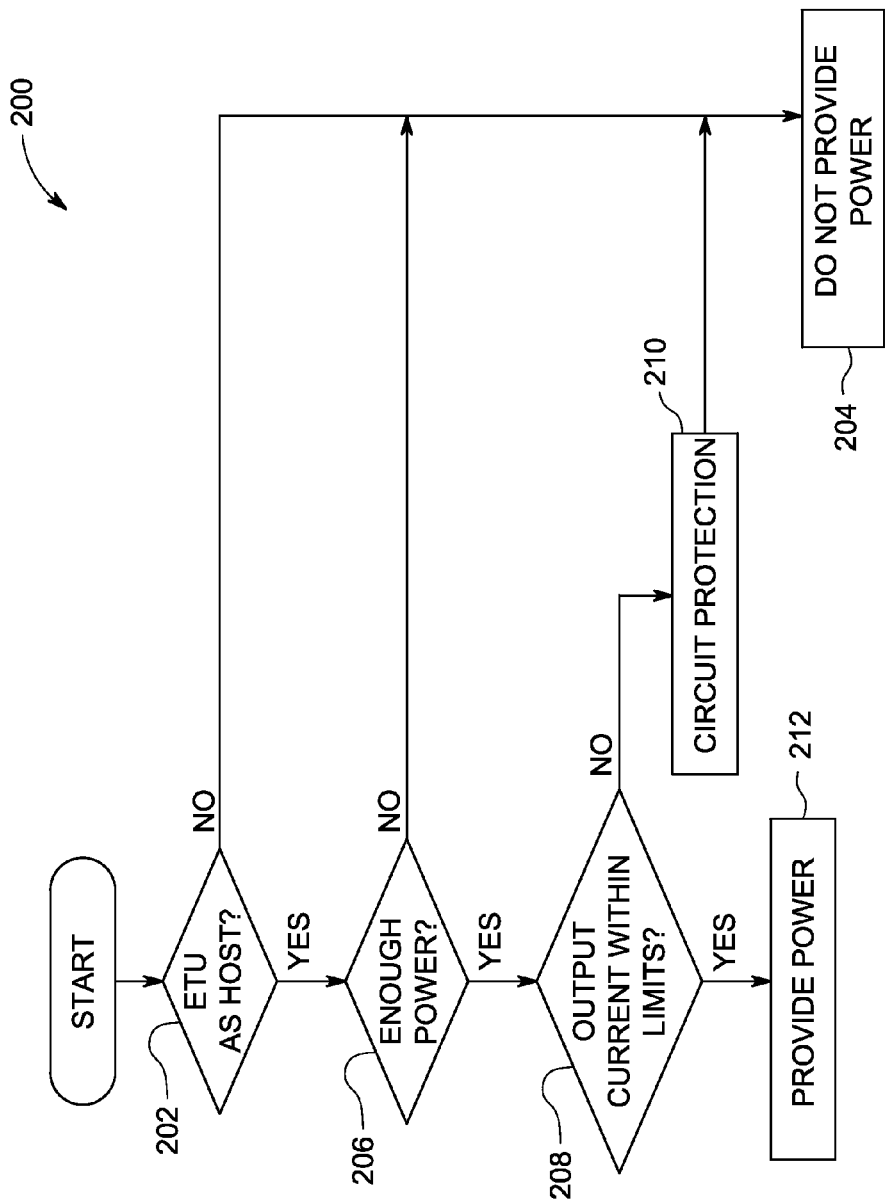
FIG. 2 is a flowchart of a method for enabling an ETU to function as a host controller, in accordance with an exemplary embodiment of the present invention.

FIG. 2 is a flowchart of a method 200 for enabling ETU 102 to function as a host controller, in accordance with an exemplary embodiment of the present invention. At step 202, host-detection component 120 determines whether peripheral device 124 is connected to power bus port 122. If host-detection component 120 determines that peripheral device 124 is not connected to power bus port 122, switch 110 is opened, if it is not already opened, and power is unavailable at power bus port 122. However, if host-detection component 120 instead determines that peripheral device 124 is connected to power bus port 122, ETU 102 proceeds to step 206 to determine whether sufficient power is available to allow ETU 102 to maintain its critical functionality while providing sufficient power at power bus port 122 for peripheral device 124 to operate. If insufficient power is available, ETU 102 causes switch 110 to open, if it is not already opened. In alternative embodiments, ETU 102 communicates with peripheral device 124 to determine whether peripheral device 124 can transition to a lower-power mode. If so, ETU 102 will determine whether sufficient power is available for peripheral device 124 to operate in the lower-power mode. However, if sufficient power is available for both peripheral device 124 and the critical functions of ETU 102, ETU 102 proceeds to step 208.

At step 208, ETU 102 determines whether a fault exists in power bus port 122 or peripheral device 124. For example, ETU 102 may pulse power to peripheral device 124 and measure the current. If the current is greater than or equal to a predetermined threshold indicative of a short circuit or other fault, as known in the art, ETU 102 will proceed to step 210 at which point ETU 102 identifies the fault as a danger to its ability to maintain its critical functions. ETU 102 then proceeds to step 204. At step 204, ETU 102 causes switch 110 to open, if it is not already opened, and power is made unavailable at power bus port 122. On the other hand, if ETU 102 does not detect a fault in power bus port 122 or peripheral device 124, ETU 102 proceeds to close switch 110 at step 212, thereby making power available at power bus port 122 for peripheral device 124.

Figure 3:
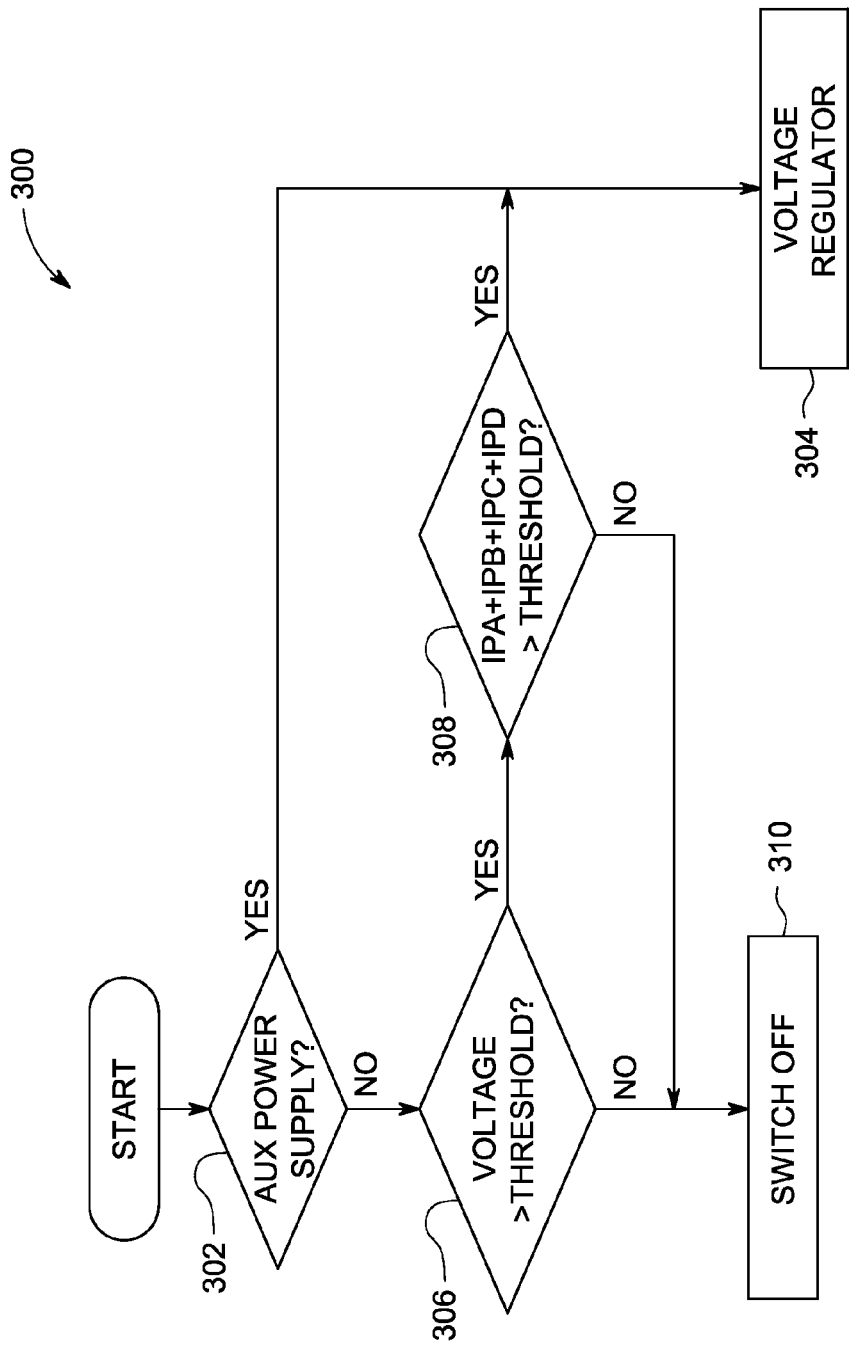
FIG. 3 is a flowchart of a method for determining if sufficient power is available to enable an ETU to function as a host controller, in accordance with an exemplary embodiment of the present invention.

FIG. 3 is a flowchart of a method 300 for determining if sufficient power is available to enable ETU 102 to function as a host controller, in accordance with an exemplary embodiment of the present invention. Method 300 is an exemplary set of steps that may be carried out within step 206 of FIG. 2. At step 302, ETU 102 determines whether auxiliary power input 128 is receiving power from an auxiliary power source. If auxiliary power input 128 is receiving power from an auxiliary power source, ETU 102 determines that sufficient power is available. That is, in most cases, an ETU operates without an auxiliary power source, instead drawing required power from one or more current transformers or other current sensors. Accordingly, if an auxiliary power source is actually connected to auxiliary power input 128, then all power requirements for supporting the critical functions of ETU 102 and peripheral device 124 are met. ETU 102 then proceeds to step 304, wherein ETU 102 allows the input power to reach voltage-regulation and current-limiting component 108.

If at step 302, ETU 102 determines that an auxiliary power source is not connected to auxiliary power input 128, ETU 102 moves to step 306. At step 306, ETU 102 determines whether power distributor 106 is providing sufficient voltage to sustain the critical functions of ETU 102 and peripheral device 124. For example, if the voltage available at power distributor 106 is at least five volts and critical functions of ETU 102 and operation of peripheral device 124 require five volts or less, then ETU 102 determines that sufficient voltage is available, and proceeds to step 308. On the other hand, if insufficient voltage is available, ETU 102 proceeds to step 310 and opens switch 110.

At step 308, ETU 102 determines whether sufficient current is available at power distributor 106 to sustain ETU critical functions and peripheral device 124. For example, ETU 102 may require 25 milliamps to maintain critical functions and peripheral device 124 may require 100 milliamps to operate in a low-power mode. Accordingly, ETU 102 determines whether a threshold amount of at least 125 milliamps are available from power distributor 106. In determining whether sufficient current is available, ETU 102 may add currents of different phases, such current on a first phase "Ipa", current on a second phase "Ipb", current on a third phase "Ipc", and current on a fourth phase "Ipd". If the sum is at least as much as the threshold, for example 125 milliamps, then ETU 102 determines that sufficient current is available. If sufficient current is available, ETU 102 proceeds to step 304, wherein the current passes to voltage-regulation and current-sensing component 108. However, if sufficient current is not available, ETU 102 opens switch 110 at step 310. As will be understood by those skilled in the art, given that power is the product of voltage and current, ETU 102 is able to determine from steps 306 and 308 whether sufficient power is available to support ETU critical functions in addition to peripheral device 124.

It should be understood that in the foregoing methods, wherein reference is made to ETU 102 carrying out the steps of the methods, the steps are carried out by components of ETU 102 shown and described with reference to FIG. 1. Further, and as stated above, it should be understood that components illustrated in FIG. 1 can be separate from each other, as shown, or included within other components. For example, microcontroller 116 may carry out functions that could otherwise be carried out by dedicated hardware.

Though microcontroller 116 has been discussed herein, microcontroller 116 may instead be, for example, one or more reduced instruction set circuits (RISC), one or more application specific integrated circuits (ASICs), one or more logic circuits, and/or any other circuit or processor capable of executing the functions described herein. Further, references to memory in this specification may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for enabling an electronic trip unit (ETU) to function as a host controller, the ETU including a power bus port, a current sensor input, and a power distributor coupled to the power bus port and the current sensor input, said method comprising:
    determining that a peripheral device is connected to the power bus port;
    determining that sufficient input power is available to the ETU to provide an output power to the peripheral device through the power bus port; and
    providing the output power to the peripheral device through the power bus port.

2. The method of claim 1, wherein the ETU further includes an auxiliary power input coupled to the power distributor, and said determining that sufficient input power is available to the ETU comprises determining that an auxiliary power is available from the auxiliary power input.

3. The method of claim 1, wherein said determining that sufficient input power is available to the ETU comprises at least one of determining that a voltage available from the power distributor is greater than or equal to a first threshold and determining that a current available from the power distributor is greater than or equal to a second threshold.

4. The method of claim 1, wherein the ETU further includes a bulk capacitor, and said providing the output power to the peripheral device through the power bus port further comprises:
    storing energy in the bulk capacitor; and
    discharging energy from the bulk capacitor to the peripheral device upon a determination that the bulk capacitor contains stored energy and that insufficient input power is available to provide the output power to the peripheral device.

5. The method of claim 1, wherein said providing the output power to the peripheral device through the power bus port comprises:
    providing the output power to the peripheral device upon a determination that the input power is greater than or equal to a first threshold; and
    preventing the output power from being provided to the peripheral device upon a determination that the input power is less than or equal to a second threshold, wherein the first threshold is greater than the second threshold.

6. The method of claim 1, said method further comprising determining whether a fault exists in the connected peripheral device.

7. The method of claim 6, wherein said determining whether a fault exists in the connected peripheral device further comprises:
    pulsing power to the peripheral device;
    measuring an output current to the peripheral device;
    determining that a fault exists in the connected peripheral device upon a determination that the output current is greater than or equal to a first safety threshold.

8. The method of claim 3, wherein determining that a current available from the power distributor is greater than or equal to a second threshold further comprises summing at least a current of a first phase with a current of a second phase.

9. The method of claim 3, wherein said determining that a current available from the power distributor is greater than or equal to a second threshold comprises:
    determining a first amount of current required for operation of the ETU;
    determining a second amount of current required for operation of the peripheral device;
    summing the first amount of current with the second amount of current to obtain the second threshold; and
    determining that the current available from the power distributor is greater than or equal to the second threshold.

10. The method of claim 9, wherein the second amount of current is 100 milliamps.

11. The method of claim 9, further comprising:
    determining a third amount of current for operation of the peripheral device, the third amount of current being higher than the second amount of current;
    summing the first amount of current with the third amount of current to obtain a third threshold; and
    determining that the current available from the power distributor is greater than or equal to the third threshold.

12. The method of claim 11, wherein the third amount of current is less than or equal to 500 milliamps.

13. An electronic trip unit (ETU) configured to function as a host controller, said ETU comprising:
    at least one current sensor input;

a power distributor coupled to said at least one current sensor input;

a memory;

a processor coupled to said memory and said power distributor;

a power bus port coupled to said processor and said power distributor;

said memory comprising processor-executable instructions that, when executed by said processor, cause said ETU to:

determine that a peripheral device is connected to said power bus port;

determine that sufficient input power is available to said ETU to provide an output power to the peripheral device through said power bus port; and provide the output power to the peripheral device through said power bus port.

14. The ETU of claim 13, wherein said ETU further comprises an auxiliary power input communicatively coupled to said power distributor, and said memory further comprises processor-executable instructions that, when executed by said processor, cause said ETU to determine that sufficient input power is available to said ETU by at least determining that auxiliary power is available from said auxiliary power input.

15. The ETU of claim 13, wherein said memory further comprises processor-executable instructions that, when executed by said processor, cause said ETU to determine that sufficient input power is available to said ETU by at least:

determining that a voltage available from said power distributor is greater than or equal to a first threshold; and determining that a current available from said power distributor is greater than or equal to a second threshold.

16. The ETU of claim 13, wherein said ETU further comprises a bulk capacitor, and said memory further comprises processor-executable instructions that, when executed by said processor, cause said ETU to provide the output power to the peripheral device through said power bus port by at least:

storing energy in said bulk capacitor; and discharging energy from said bulk capacitor to the peripheral device upon a determination that said bulk capacitor contains stored energy and that insufficient input power is available to provide the output power to the peripheral device.

17. The ETU of claim 13, wherein said memory further comprises processor-executable instructions that, when executed by said processor, cause said ETU to provide the output power to the peripheral device through said power bus port by at least:

providing the output power to the peripheral device upon a determination that the input power is greater than or equal to a first threshold; and preventing the output power from being delivered to the peripheral device upon a determination that the input power is less than or equal to a second threshold, wherein the first threshold is greater than the second threshold.

18. The ETU of claim 13, wherein said memory further comprises processor-executable instructions that, when executed by said processor, cause said ETU to determine whether a fault exists in the connected peripheral device.

19. The ETU of claim 18, wherein said memory further comprises processor-executable instructions that, when executed by said processor, cause said ETU to determine whether a fault exists in the connected peripheral device by at least:

pulsing power to the peripheral device;

measuring an output current to the peripheral device; and determining that a fault exists in the connected peripheral device upon a determination that the output current is greater than or equal to a first safety threshold.

20. A system for monitoring and diagnosing errors in an electronic trip unit (ETU), said system comprising:

an ETU comprising a power bus port; and an ETU diagnostic device connected to said power bus port, wherein said ETU is configured to:

determine that sufficient power is available to said ETU to sustain operation of both said ETU and said ETU diagnostic device; and provide, based on the determination, power to said ETU diagnostic device through said power bus port.

* * * * *

UNITED STATES PATENT AND TRADEMARK OFFICE
CERTIFICATE OF CORRECTION

PATENT NO. : 8,810,987 B2  
APPLICATION NO. : 13/656374  
DATED : August 19, 2014  
INVENTOR(S) : Williams et al.

Page 1 of 1

It is certified that error appears in the above-identified patent and that said Letters Patent is hereby corrected as shown below:

In the Specification

In Column 3, Lines 56-57, delete "Power-measuring component 116" and insert -- Power-measuring component 114 --, therefor.

In Column 3, Line 61, delete "Power-measuring component 116" and insert -- Power-measuring component 114 --, therefor.

Signed and Sealed this
Fourth Day of August, 2015

Michelle K. Lee
*Director of the United States Patent and Trademark Office*